United States Patent
Tremblay et al.

(10) Patent No.: US 7,437,534 B2
(45) Date of Patent: Oct. 14, 2008

(54) LOCAL AND GLOBAL REGISTER PARTITIONING TECHNIQUE

(75) Inventors: Marc Tremblay, Menlo Park, CA (US); William N. Joy, Aspen, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 196 days.

(21) Appl. No.: 11/533,314

(22) Filed: Sep. 19, 2006

(65) Prior Publication Data

US 2007/0016758 A1    Jan. 18, 2007

Related U.S. Application Data

(63) Continuation of application No. 09/204,585, filed on Dec. 3, 1998, now Pat. No. 7,114,056.

(51) Int. Cl.
*G06F 15/16* (2006.01)
*G06F 12/00* (2006.01)

(52) U.S. Cl. ............................. 712/30; 712/24; 711/148

(58) Field of Classification Search ............. 712/24, 712/28, 29, 30; 711/148, 209
See application file for complete search history.

(56) References Cited

U.S. PATENT DOCUMENTS

| | | | | |
|---|---|---|---|---|
| 5,301,340 A | * | 4/1994 | Cook | 712/24 |
| 5,655,132 A | * | 8/1997 | Watson | 718/104 |
| 5,732,250 A | * | 3/1998 | Bates et al. | 713/600 |
| 6,192,384 B1 | * | 2/2001 | Dally et al. | 708/200 |
| 6,219,777 B1 | * | 4/2001 | Inoue | 712/23 |

OTHER PUBLICATIONS

Rotenberg et al., "Trace Processors", Proceedings of the thirtieth Annual IEEE/ACM International Symposium on Microarchitecture, Dec. 1-3, 1997, pp. 138-148.*
Farkas et al., "The Multicluster Architecture: Reducing Cycle Time through Partitioning", Proceedings of the thirtieth Annual IEEE/ACM International Symposium on Microarchitecture, Dec. 1-3, 1997, pp. 149-159.*
Llosa et al., "Non-Consistent Dual Register Files to Reduce Register Pressure", Proceedings of the First IEEE Symposium on High-Performance Computer Architecture, Jan. 22-25, 1995, pp. 22-31.*

* cited by examiner

*Primary Examiner*—William M Treat
(74) *Attorney, Agent, or Firm*—Gunnison, McKay & Hodgson, L.L.P.

(57) ABSTRACT

A Very Long Instruction Word (VLIW) processor having a plurality of functional units includes a multi-ported register file that is divided into a plurality of separate register file segments, each of the register file segments being associated to one of the plurality of functional units. The register file segments are partitioned into local registers and global registers. The global registers are read and written by all functional units. The local registers are read and written only by a functional unit associated with a particular register file segment. The local registers and global registers are addressed using register addresses in an address space that is separately defined for a register file segment/functional unit pair. The global registers are addressed within a selected global register range using the same register addresses for the plurality of register file segment/functional unit pairs. The local registers in a register file segment are addressed using register addresses in a local register range outside the global register range that are assigned within a single register file segment/functional unit pair. Register addresses in the local register range are the same for the plurality of register file segment/functional unit pairs and address registers locally within a register file segment/functional unit pair.

11 Claims, 11 Drawing Sheets muladd   Ra, Rb, Rc, Rd

LOCAL AND GLOBAL REGISTER PARTITIONING TECHNIQUE

CROSS-REFERENCE TO RELATED APPLICATIONS

This application is a continuation of U.S. patent application Ser. No. 09/204,585, filed Dec. 3, 1998 now U.S. Pat. No. 7,114,056, the entirety of which is incorporated herein by reference.

In addition, the present application is related to subject matter disclosed in the following patent applications:

U.S. patent application Ser. No. 09/204,480, filed Dec. 3, 1998, now U.S. Pat. No. 6,718,457; U.S. patent application Ser. No. 09/204,584, filed Dec. 3, 1998, now U.S. Pat. No. 6,615,338; U.S. patent application Ser. No. 09/204,481, filed Dec. 3, 1998, now U.S. Pat. No. 6,343,348; U.S. patent application Ser. No. 09/204,536, filed Dec. 3, 1998, now abandoned; U.S. patent application Ser. No. 09/204,586, filed Dec. 3, 1998, now U.S. Pat. No. 6,205,543; U.S. patent application Ser. No. 09/205,121, filed Dec. 3, 1998, now U.S. Pat. No. 6,321,325; U.S. patent application Ser. No. 09/204,781, filed Dec. 3, 1998, now U.S. Pat. No. 6,249,861; U.S. patent application Ser. No. 09/204,535, filed Dec. 3, 1998, now U.S. Pat. No. 6,279,100; and U.S. patent application Ser. No. 09/204,479, filed Dec. 3, 1998.

BACKGROUND OF THE INVENTION

1. Field of the Invention

The present invention relates to storage or memory in a processor. More specifically, the present invention relates to a storage having local and global access regions for subinstructions in a Very Long Instruction Word (VLIW) processor.

2. Description of the Related Art

One technique for improving the performance of processors is parallel execution of multiple instructions to allow the instruction execution rate to exceed the clock rate. Various types of parallel processors have been developed including Very Long Instruction Word (VLIW) processors that use multiple, independent functional units to execute multiple instructions in parallel. VLIW processors package multiple operations into one very long instruction, the multiple operations being determined by sub-instructions that are applied to the independent functional units. An instruction has a set of fields corresponding to each functional unit. Typical bit lengths of a subinstruction commonly range from 16 to 24 bits per functional unit to produce an instruction length often in a range from 112 to 168 bits.

The multiple functional units are kept busy by maintaining a code sequence with sufficient operations to keep instructions scheduled. A VLIW processor often uses a technique called trace scheduling to maintain scheduling efficiency by unrolling loops and scheduling code across basic function blocks. Trace scheduling also improves efficiency by allowing instructions to move across branch points.

Limitations of VLIW processing include limited parallelism, limited hardware resources, and a vast increase in code size. A limited amount of parallelism is available in instruction sequences. Unless loops are unrolled a very large number of times, insufficient operations are available to fill the instructions. Limited hardware resources are a problem, not only because of duplication of functional units but more importantly due to a large increase in memory and register file bandwidth. A large number of read and write ports are necessary for accessing the register file, imposing a bandwidth that is difficult to support without a large cost in the size of the register file and degradation in clock speed. As the number of ports increases, the complexity of the memory system further increases. To allow multiple memory accesses in parallel, the memory is divided into multiple banks having different addresses to reduce the likelihood that multiple operations in a single instruction have conflicting accesses that cause the processor to stall since synchrony must be maintained between the functional units.

Code size is a problem for several reasons. The generation of sufficient operations in a nonbranching code fragment requires substantial unrolling of loops, increasing the code size. Also, instructions that are not full may include unused subinstructions that waste code space, increasing code size. Furthermore, the increase in the size of storages such as the register file increase the number of bits in the instruction for addressing registers in the register file.

A register file with a large number of registers is often used to increase performance of a VLIW processor. A VLIW processor is typically implemented as a deeply pipelined engine with an "in-order" execution model. To attain a high performance a large number of registers is utilized so that the multiple functional units are busy as often as possible.

A large register file has several drawbacks. First, as the number of registers that are directly addressable is increased, the number of bits used to specify the multiple registers within the instruction increases proportionally. For a rich instruction set architecture with, for example, four register specifiers, an additional bit for a register specifier effectively costs four bits per subinstruction (one bit per register specifier). For a VLIW word with four to eight subinstructions, sixteen to thirty-two bits are added for instruction encoding. Second, a register file with many registers occupies a large area. Third, a register file with many registers may create critical timing paths and therefore limit the cycle time of the processor.

What is needed is a technique and processor architecture enhancement that improves the efficiency of instruction coding but still allows access to a large set of architecturally-visible registers.

SUMMARY OF THE INVENTION

A Very Long Instruction Word (VLIW) processor having a plurality of functional units and includes a multi-ported register file that is divided into a plurality of separate register file segments, each of the register file segments being associated to one of the plurality of functional units. The register file segments are partitioned into local registers and global registers. The global registers are read and written by all functional units. The local registers are read and written only by a functional unit associated with a particular register file segment. The local registers and global registers are addressed using register addresses in an address space that is separately defined for a register file segment/functional unit pair. The global registers are addressed within a selected global register range using the same register addresses for the plurality of register file segment/functional unit pairs. The local registers in a register file segment are addressed using register addresses in a local register range outside the global register range that are assigned within a single register file segment/functional unit pair. Register addresses in the local register range are the same for the plurality of register file segment/functional unit pairs and address registers locally within a register file segment/functional unit pair.

A VLIW processor utilizes a very long instruction word that includes a plurality of subinstructions. The subinstructions are allocated into positions of the instruction word. The VLIW processor includes a register file that is divided into a plurality of register file segments. The VLIW processor also includes a plurality of functional units, each of which is coupled to and associated with a register file segment of the register file. Each of the subinstructions executes on a particular functional unit, operating upon operands read from and written to a particular register file segment that is associated with the functional unit. The register file segments include a plurality of registers that are partitioned into global registers and local registers. A global register is a register that is accessed by all of the plurality of functional units and is therefore is read and/or written by all functional units. A local register is a register that is only accessible by a particular subinstruction and is only readable and writable by the specific functional unit that executes instructions in the particular subinstruction position.

A register file includes N physical registers. The N-register register file is duplicated into M register file segments, each having a reduced number of read and/or write ports in comparison to a nonduplicated register file, but each having the same number of physical registers. The register file segments are partitioned into $N_G$ global and $N_L$ local register files where $N_G$ plus $N_L$ is equal to N. The register file operates equivalently to having $N_G+(M*N_L)$ total registers available for the M subinstructions. The number of address bits for addressing the $N_G+(M*N_L)$ total registers remains equal to the number of bits B that are used to address $N=2^B$ registers. The local registers for each of the M register file segments are addressed using the same B-bit values.

In one example, each of M equal to four register file segments includes N equal to 128 registers. The number $N_G$ of global registers is set to 96 while the number $N_L$ of local registers in each register file segment is set to 32. Therefore, the total number of distinct and independent registers is 96+(4*32)=224. The 224 registers are addressed using 7 bits that define an address space from 0-127, rather than the 8 bits that are otherwise required to access 224 registers. In one example, the 96 global registers are addressed using address specifiers 0-95 in all of the four register file segments. Local registers 96-127 in a register file segment 0, local registers 128-159 in register file segment 1, local registers 160-191 in register file segment 2, and local registers 192-223 in register file segment 3 are all addressed using register addresses 96-127.

One address bit is thus saved for each of the four subinstruction positions, a savings of four bits per subinstruction and a savings of 16 bits for a VLIW instruction. The reduction in address bits is highly advantageous in a VLIW processor that includes powerful functional units that execute a large plurality of instructions, each of which is to be encoded in the VLIW instruction word.

In some embodiments, partitioning of the register file is programmable so that the number $N_G$ of global registers and number $N_L$ of local registers is selectable and variable. For example, a register file including four register file segments each having 128 registers may be programmably configured as a flat register file with 128 global registers and 0 local registers with the 128 registers addressed using seven address bits. Alternatively, the four register file segments may be programmably configured, for example, to include 64 global registers and 64 local registers so that the total number of registers is 64+(4*64)=320 registers that are again addressed using 7 bits rather than the 9 bits that would otherwise be required to address 320 registers.

BRIEF DESCRIPTION OF THE DRAWINGS

The features of the described embodiments are specifically set forth in the appended claims. However, embodiments of the invention relating to both structure and method of operation, may best be understood by referring to the following description and accompanying drawings.

DESCRIPTION OF THE EMBODIMENT(S)

Figure 1:
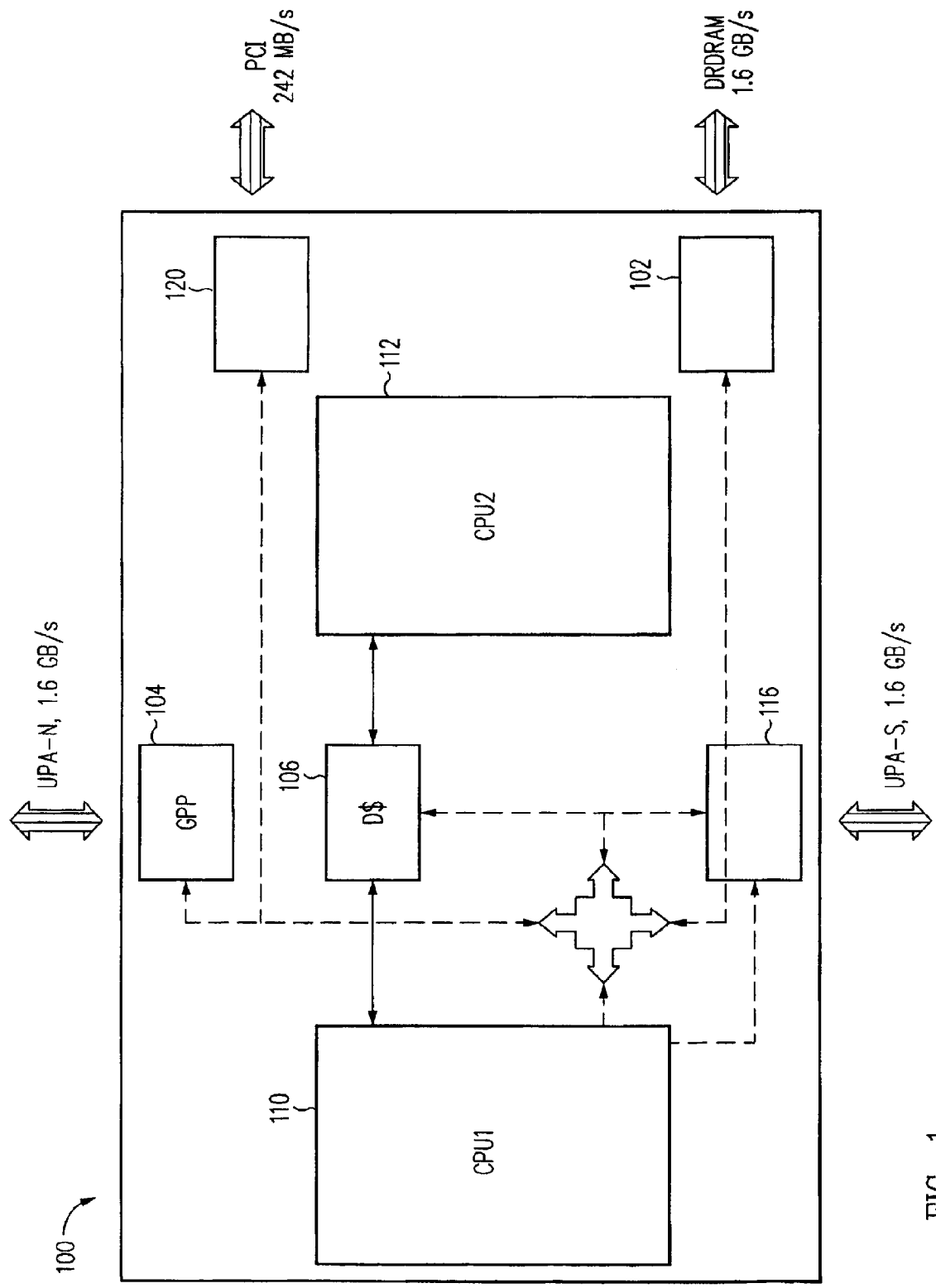
FIG. 1 is a schematic block diagram illustrating a single integrated circuit chip implementation of a processor in accordance with an embodiment of the present invention.

Referring to FIG. 1, a schematic block diagram illustrates a single integrated circuit chip implementation of a processor 100 that includes a memory interface 102, a geometry decompressor 104, two media processing units 110 and 112, a shared data cache 106, and several interface controllers. The interface controllers support an interactive graphics environment with real-time constraints by integrating fundamental components of memory, graphics, and input/output bridge functionality on a single die. The components are mutually linked and closely linked to the processor core with high bandwidth, low-latency communication channels to manage multiple high-bandwidth data streams efficiently and with a low response time. The interface controllers include a an UltraPort Architecture Interconnect (UPA) controller 116 and a peripheral component interconnect (PCI) controller 120. The illustrative memory interface 102 is a direct Rambus dynamic RAM (DRDRAM) controller. The shared data cache 106 is a dual-ported storage that is shared among the media processing units 110 and 112 with one port allocated to each media processing unit. The data cache 106 is four-way set associative, follows a write-back protocol, and supports hits in the fill buffer (not shown). The data cache 106 allows fast data sharing and eliminates the need for a complex, error-prone cache coherency protocol between the media processing units 110 and 112.

The UPA controller 116 maintains a duplicate set of cache tags in the system and performs duplicate tag lookup and main memory initiation in parallel pipelines for each coherent transaction. The approach of the UPA controller 116 attains reduced latency on cache misses and improved utilization of address, datapath, and main memory in comparison to directory-based systems. Directory-based systems maintain coherence states for each data block in main memory and require read-modify-write penalty for every read transaction that reaches main memory. The UPA controller 116 is a centralized system controller that removes the need to place cache coherence logic on the processor 100 and DMA devices, thereby simplifying the circuitry.

The PCI controller 120 is used as the primary system I/O interface for connecting standard, high-volume, low-cost peripheral devices, although other standard interfaces may also be used. The PCI bus effectively transfers data among high bandwidth peripherals and low bandwidth peripherals, such as CD-ROM players, DVD players, and digital cameras.

Two media processing units 110 and 112 are included in a single integrated circuit chip to support an execution environment exploiting thread level parallelism in which two independent threads can execute simultaneously. The threads may arise from any sources such as the same application, different applications, the operating system, or the runtime environment. Parallelism is exploited at the thread level since parallelism is rare beyond four, or even two, instructions per cycle in general purpose code. For example, the illustrative processor 100 is an eight-wide machine with eight execution units for executing instructions. A typical "general-purpose" processing code has an instruction level parallelism of about two so that, on average, most (about six) of the eight execution units would be idle at any time. The illustrative processor 100 employs thread level parallelism and operates on two independent threads, possibly attaining twice the performance of a processor having the same resources and clock rate but utilizing traditional non-thread parallelism.

Thread level parallelism is particularly useful for Java™ applications which are bound to have multiple threads of execution. Java™ methods including "suspend", "resume", "sleep", and the like include effective support for threaded program code. In addition, Java™ class libraries are thread-safe to promote parallelism. (Java™, Sun, Sun Microsystems and the Sun Logo are trademarks or registered trademarks of Sun Microsystems, Inc. in the United States and other countries. All SPARC trademarks, including UltraSPARC I and UltraSPARC II, are used under license and are trademarks of SPARC International, Inc. in the United States and other countries. Products bearing SPARC trademarks are based upon an architecture developed by Sun Microsystems, Inc.) Furthermore, the thread model of the processor 100 supports a dynamic compiler which runs as a separate thread using one media processing unit 110 while the second media processing unit 112 is used by the current application. In the illustrative system, the compiler applies optimizations based on "on-the-fly" profile feedback information while dynamically modifying the executing code to improve execution on each subsequent run. For example, a "garbage collector" may be executed on a first media processing unit 110, copying objects or gathering pointer information, while the application is executing on the other media processing unit 112.

Although the processor 100 shown in FIG. 1 includes two processing units on an integrated circuit chip, the architecture is highly scaleable so that one to several closely-coupled processors may be formed in a message-based coherent architecture and resident on the same die to process multiple threads of execution. Thus, in the processor 100, a limitation on the number of processors formed on a single die thus arises from capacity constraints of integrated circuit technology rather than from architectural constraints relating to the interactions and interconnections between processors.

Figure 2:
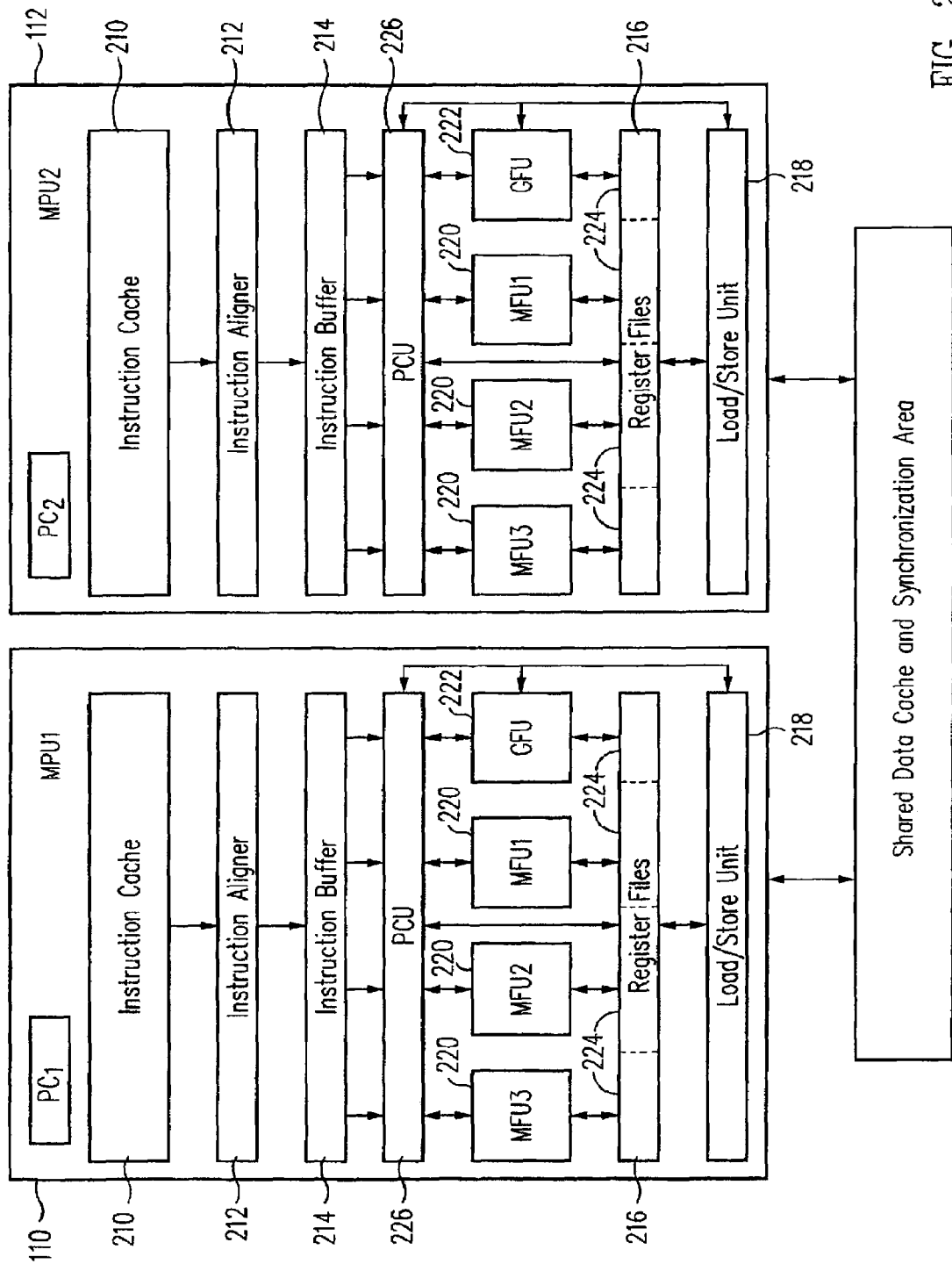
FIG. 2 is a schematic block diagram showing the core of the processor.

Referring to FIG. 2, a schematic block diagram shows the core of the processor 100. The media processing units 110 and 112 each include an instruction cache 210, an instruction aligner 212, an instruction buffer 214, a pipeline control unit 226, a split register file 216, a plurality of execution units, and a load/store unit 218. In the illustrative processor 100, the media processing units 110 and 112 use a plurality of execution units for executing instructions. The execution units for a media processing unit 110 include three media functional units (MFU) 220 and one general functional unit (GFU) 222. The media functional units 220 are multiple single-instruction-multiple-datapath (MSIMD) media functional units. Each of the media functional units 220 is capable of processing parallel 16-bit components. Various parallel 16-bit operations supply the single-instruction-multiple-datapath capability for the processor 100 including add, multiply-add, shift, compare, and the like. The media functional units 220 operate in combination as tightly-coupled digital signal processors (DSPs). Each media functional unit 220 has an separate and individual sub-instruction stream, but all three media functional units 220 execute synchronously so that the subinstructions progress lock-step through pipeline stages.

The general functional unit 222 is a RISC processor capable of executing arithmetic logic unit (ALU) operations, loads and stores, branches, and various specialized and esoteric functions such as parallel power operations, reciprocal square root operations, and many others. The general functional unit 222 supports less common parallel operations such as the parallel reciprocal square root instruction.

The illustrative instruction cache 210 has a 16 Kbyte capacity and includes hardware support to maintain coherence, allowing dynamic optimizations through self-modifying code. Software is used to indicate that the instruction storage is being modified when modifications occur. The 16K capacity is suitable for performing graphic loops, other multimedia tasks or processes, and general-purpose Java™ code. Coherency is maintained by hardware that supports write-through, non-allocating caching. Self-modifying code is supported through explicit use of "store-to-instruction-space" instructions store2i. Software uses the store2i instruction to maintain coherency with the instruction cache 210 so that the instruction caches 210 do not have to be snooped on every single store operation issued by the media processing unit 110.

The pipeline control unit 226 is connected between the instruction buffer 214 and the functional units and schedules the transfer of instructions to the functional units. The pipeline control unit 226 also receives status signals from the functional units and the load/store unit 218 and uses the status signals to perform several control functions. The pipeline control unit 226 maintains a scoreboard, generates stalls and bypass controls. The pipeline control unit 226 also generates traps and maintains special registers.

Each media processing unit 110 and 112 includes a split register file 216, a single logical register file including 128 thirty-two bit registers. The split register file 216 is split into a plurality of register file segments 224 to form a multi-ported structure that is replicated to reduce the integrated circuit die area and to reduce access time. A separate register file segment 224 is allocated to each of the media functional units 220 and the general functional unit 222. In the illustrative embodiment, each register file segment 224 has 128 32-bit registers. The first 96 registers (0-95) in the register file segment 224 are global registers. All functional units can write to the 96 global registers. The global registers are coherent across all functional units (MFU and GFU) so that any write operation to a global register by any functional unit is broadcast to all register file segments 224. Registers 96-127 in the register file segments 224 are local registers. Local registers allocated to a functional unit are not accessible or "visible" to other functional units.

The media processing units 110 and 112 are highly structured computation blocks that execute software-scheduled data computation operations with fixed, deterministic and relatively short instruction latencies, operational characteristics yielding simplification in both function and cycle time. The operational characteristics support multiple instruction issue through a pragmatic very large instruction word (VLIW) approach that avoids hardware interlocks to account for software that does not schedule operations properly. Such hardware interlocks are typically complex, error-prone, and create multiple critical paths. A VLIW instruction word always includes one instruction that executes in the general functional unit (GFU) 222 and from zero to three instructions that execute in the media functional units (MFU) 220. A MFU instruction field within the VLIW instruction word includes an operation code (opcode) field, three source register (or immediate) fields, and one destination register field.

Instructions are executed in-order in the processor 100 but loads can finish out-of-order with respect to other instructions and with respect to other loads, allowing loads to be moved up in the instruction stream so that data can be streamed from main memory. The execution model eliminates the usage and overhead resources of an instruction window, reservation stations, a re-order buffer, or other blocks for handling instruction ordering. Elimination of the instruction ordering structures and overhead resources is highly advantageous since the eliminated blocks typically consume a large portion of an integrated circuit die. For example, the eliminated blocks consume about 30% of the die area of a Pentium II processor.

To avoid software scheduling errors, the media processing units 110 and 112 are high-performance but simplified with respect to both compilation and execution. The media processing units 110 and 112 are most generally classified as a simple 2-scalar execution engine with full bypassing and hardware interlocks on load operations. The instructions include loads, stores, arithmetic and logic (ALU) instructions, and branch instructions so that scheduling for the processor 100 is essentially equivalent to scheduling for a simple 2-scalar execution engine for each of the two media processing units 110 and 112.

The processor 100 supports full bypasses between the first two execution units within the media processing unit 110 and 112 and has a scoreboard in the general functional unit 222 for load operations so that the compiler does not need to handle nondeterministic latencies due to cache misses. The processor 100 scoreboards long latency operations that are executed in the general functional unit 222, for example a reciprocal square-root operation, to simplify scheduling across execution units. The scoreboard (not shown) operates by tracking a record of an instruction packet or group from the time the instruction enters a functional unit until the instruction is finished and the result becomes available. A VLIW instruction packet contains one GFU instruction and from zero to three MFU instructions. The source and destination registers of all instructions in an incoming VLIW instruction packet are checked against the scoreboard. Any true dependencies or output dependencies stall the entire packet until the result is ready. Use of a scoreboarded result as an operand causes instruction issue to stall for a sufficient number of cycles to allow the result to become available. If the referencing instruction that provokes the stall executes on the general functional unit 222 or the first media functional unit 220, then the stall only endures until the result is available for intra-unit bypass. For the case of a load instruction that hits in the data cache 106, the stall may last only one cycle. If the referencing instruction is on the second or third media functional units 220, then the stall endures until the result reaches the writeback stage in the pipeline where the result is bypassed in transmission to the split register file 216.

The scoreboard automatically manages load delays that occur during a load hit. In an illustrative embodiment, all loads enter the scoreboard to simplify software scheduling and eliminate NOPs in the instruction stream.

The scoreboard is used to manage most interlocks between the general functional unit 222 and the media functional units 220. All loads and non-pipelined long-latency operations of the general functional unit 222 are scoreboarded. The long-latency operations include division idiv, fdiv instructions, reciprocal square root frecsqrt, precsqrt instructions, and power ppower instructions. None of the results of the media functional units 220 is scoreboarded. Non-scoreboarded results are available to subsequent operations on the functional unit that produces the results following the latency of the instruction.

The illustrative processor 100 has a rendering rate of over fifty million triangles per second without accounting for operating system overhead. Therefore, data feeding specifications of the processor 100 are far beyond the capabilities of cost-effective memory systems. Sufficient data bandwidth is achieved by rendering of compressed geometry using the geometry decompressor 104, an on-chip real-time geometry decompression engine. Data geometry is stored in main memory in a compressed format. At render time, the data geometry is fetched and decompressed in real-time on the integrated circuit of the processor 100. The geometry decompressor 104 advantageously saves memory space and memory transfer bandwidth. The compressed geometry uses an optimized generalized mesh structure that explicitly calls out most shared vertices between triangles, allowing the processor 100 to transform and light most vertices only once. In a typical compressed mesh, the triangle throughput of the transform-and-light stage is increased by a factor of four or more over the throughput for isolated triangles. For example, during processing of triangles, multiple vertices are operated upon in parallel so that the utilization rate of resources is high, achieving effective spatial software pipelining. Thus operations are overlapped in time by operating on several vertices simultaneously, rather than overlapping several loop iterations in time. For other types of applications with high instruction level parallelism, high trip count loops are software-pipelined so that most media functional units 220 are fully utilized.

Figure 3:
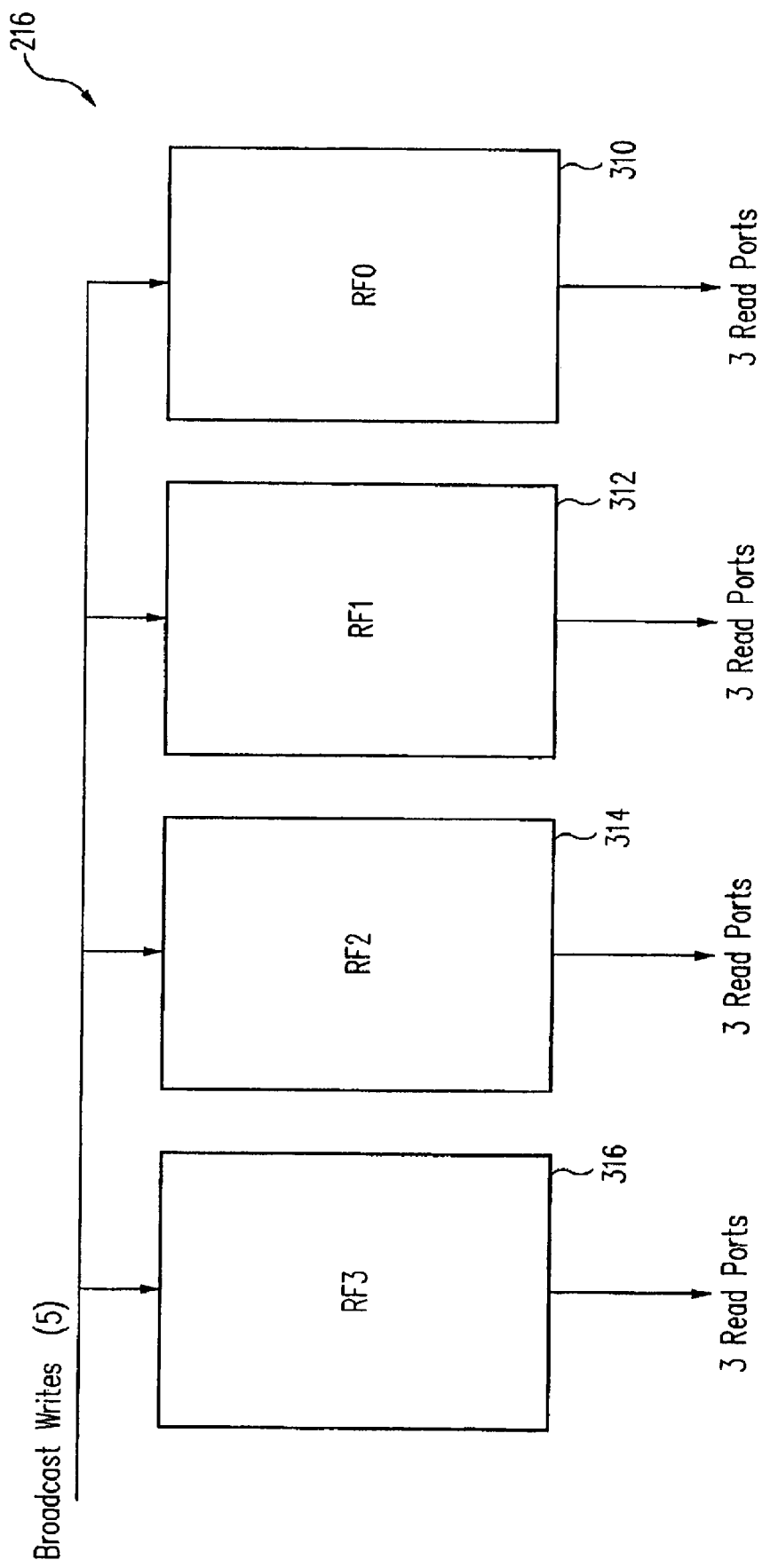
FIG. 3 is a schematic block diagram that illustrates an embodiment of the split register file that is suitable for usage in the processor.

Referring to FIG. 3, a schematic block diagram illustrates an embodiment of the split register file 216 that is suitable for usage in the processor 100. The split register file 216 supplies all operands of processor instructions that execute in the media functional units 220 and the general functional units 222 and receives results of the instruction execution from the execution units. The split register file 216 operates as an interface to the geometry decompressor 104. The split register file 216 is the source and destination of store and load operations, respectively.

In the illustrative processor 100, the split register file 216 in each of the media processing units 110 and 112 has 128 registers. Graphics processing places a heavy burden on register usage. Therefore, a large number of registers is supplied by the split register file 216 so that performance is not limited by loads and stores or handling of intermediate results including graphics "fills" and "spills". The illustrative split register file 216 includes twelve read ports and five write ports, supplying total data read and write capacity between the central registers of the split register file 216 and all media functional units 220, the general functional unit 222 and the load/store unit 218 that is connected to the general functional unit 222. The five write ports include one 64-bit write port that is dedicated to load operations. The remaining four write ports are 32 bits wide and are used to write operations of the general functional unit 222 and the media functional units 220.

Total read and write capacity promotes flexibility and facility in programming both of hand-coded routines and compiler-generated code.

Large, multiple-ported register files are typically metal-limited so that the register area is proportional with the square of the number of ports. A sixteen port file is roughly proportional in size and speed to a value of 256. The illustrative split register file 216 is divided into four register file segments 310, 312, 314, and 316, each having three read ports and four write ports so that each register file segment has a size and speed proportional to 49 for a total area for the four segments that is proportional to 196. The total area is therefore potentially smaller and faster than a single central register file. Write operations are fully broadcast so that all files are maintained coherent. Logically, the split register file 216 is no different from a single central register file However, from the perspective of layout efficiency, the split register file 216 is highly advantageous, allowing for reduced size and improved performance through faster access.

The new media data that is operated upon by the processor 100 is typically heavily compressed. Data transfers are communicated in a compressed format from main memory and input/output devices to pins of the processor 100, subsequently decompressed on the integrated circuit holding the processor 100, and passed to the split register file 216.

Splitting the register file into multiple segments in the split register file 216 in combination with the character of data accesses in which multiple bytes are transferred to the plurality of execution units concurrently, results in a high utilization rate of the data supplied to the integrated circuit chip and effectively leads to a much higher data bandwidth than is supported on general-purpose processors. The highest data bandwidth requirement is therefore not between the input/output pins and the central processing units, but is rather between the decompressed data source and the remainder of the processor. For graphics processing, the highest data bandwidth requirement is between the geometry decompressor 104 and the split register file 216. For video decompression, the highest data bandwidth requirement is internal to the split register file 216. Data transfers between the geometry decompressor 104 and the split register file 216 and data transfers between various registers of the split register file 216 can be wide and run at processor speed, advantageously delivering a large bandwidth. In addition, the split register file 216 can be multiported which further increases total bandwidth.

The register file 216 is a focal point for attaining the very large bandwidth of the processor 100. The processor 100 transfers data using a plurality of data transfer techniques. In one example of a data transfer technique, cacheable data is loaded into the split register file 216 through normal load operations at a low rate of up to eight bytes per cycle. In another example, streaming data is transferred to the split register file 216 through group load operations which transfer thirty-two bytes from memory directly into eight consecutive 32-bit registers. For example, the processor 100 utilizes the streaming data operation to receive compressed video data for decompression.

Compressed graphics data is received via a direct memory access (DMA) unit in the geometry decompressor 104. The compressed graphics data is decompressed by the geometry decompressor 104 and loaded at a high bandwidth rate into the split register file 216 via group load operations that are mapped to the geometry decompressor 104.

Load operations are non-blocking and scoreboarded so that a long latency inherent to loads can be hidden by early scheduling.

General purpose applications often fail to exploit the large register file 216. Statistical analysis shows that compilers do not effectively use the large number of registers in the split register file 216. However, aggressive in-lining techniques that have traditionally been restricted due to the limited number of registers in conventional systems may be advantageously used in the processor 100 to exploit the large number of registers in the split register file 216. In a software system that exploits the large number of registers in the processor 100, the complete set of registers is saved upon the event of a thread (context) switch. When only a few registers of the entire set of registers is used, saving all registers in the full thread switch is wasteful. Waste is avoided in the processor 100 by supporting individual marking of registers. Octants of the thirty-two registers can be marked as "dirty" if used, and are consequently saved conditionally.

In various embodiments, the split register file 216 is leveraged by dedicating fields for globals, trap registers, and the like.

Figure 4:
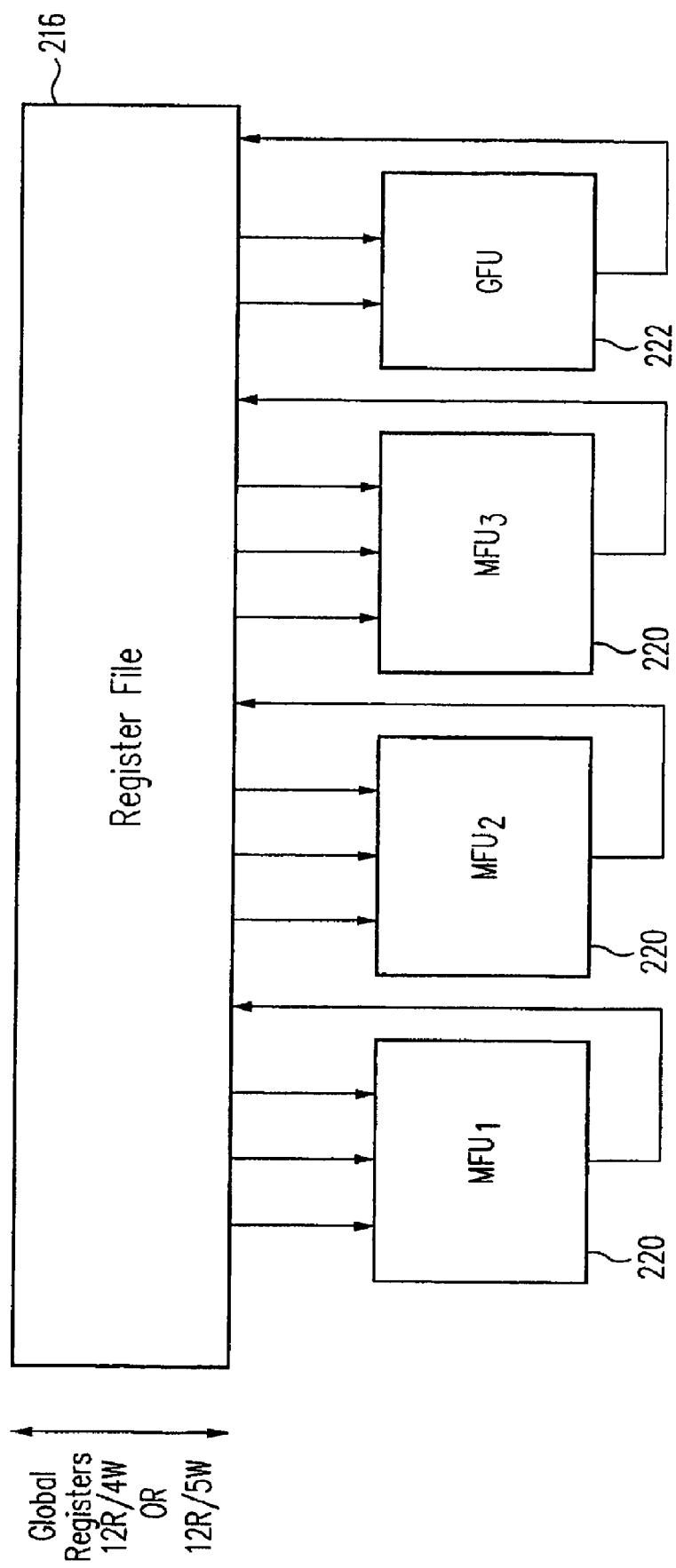
FIG. 4 is a schematic block diagram that shows a logical view of the register file and functional units in the processor.

Referring to FIG. 4, a schematic block diagram shows a logical view of the register file 216 and functional units in the processor 100. The physical implementation of the core processor 100 is simplified by replicating a single functional unit to form the three media functional units 220. The media functional units 220 include circuits that execute various arithmetic and logical operations including general-purpose code, graphics code, and video-image-speech (VIS) processing. VIS processing includes video processing, image processing, digital signal processing (DSP) loops, speech processing, and voice recognition algorithms, for example.

Figure 5A:
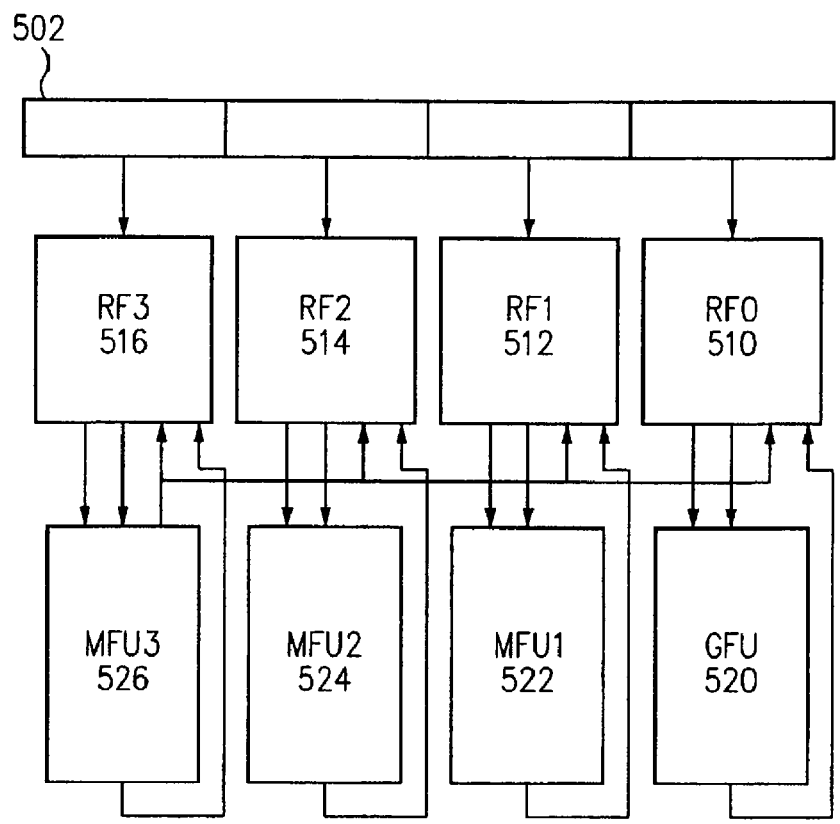
FIGS. 5A, 5B, and 5C show a schematic block diagram of a divided or split register file, a high level view of computation elements of a functional unit, and a pictorial view of an instruction format, respectively, which are used to illustrate the difficulty of defining an instruction format with a limited number of instruction bits.
Figure 5B:
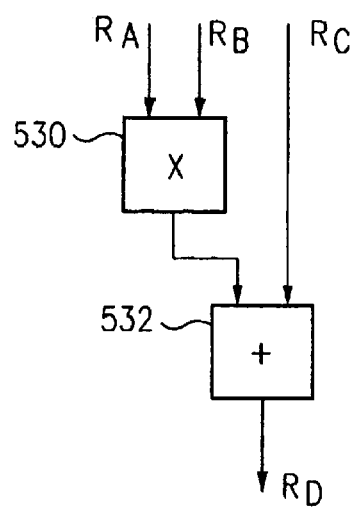
Figure 5C:
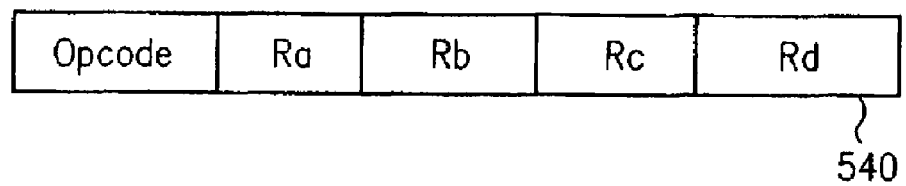

Referring to FIGS. 5A, 5B, and 5C, a schematic block diagram of a divided or split register file, a high level view of computation elements of a functional unit, and a pictorial view of an instruction format, respectively are used to illustrate the difficulty of defining an instruction format with a limited number of instruction bits. FIG. 5A shows a schematic block diagram of a decoder 502 that decodes four subinstructions of a very long instruction word. Each of the four decoders applies control signals to one of four register file segments 510, 512, 514, and 516. Each of the register file segments is coupled to and associated with a functional unit. In the illustrative embodiment, a first register file segment 510 is coupled to and associated with a general functional unit 520. Second, third, and fourth register file segments 512, 514, and 516 are respectively coupled to and associated with media functional units 522, 524, and 526.

FIG. 5B shows an example of a VLIW subinstruction, specifically a multiply-add (muladd) instruction and relates execution of the muladd instruction to computation blocks in a functional unit. The muladd instruction specifies four register specifiers designating data that is operated upon by the functional unit. The muladd instruction specifies three source operands $R_A$, $R_B$, and $R_C$, and one destination operand RD. The functional unit includes a multiplier 530 that multiplies the source operands $R_A$ and $R_B$ to generate a product. The functional unit also includes an adder 532 that receives the product from the multiplier 530 and adds the product and the source operand $R_C$ to produce a sum that is transferred to the destination register operand $R_D$.

For a register file in which the register file segments include $N=2^M$ registers, for example, M bits are used to uniquely specify a particular register so that 4*M are needed to uniquely specify the four registers addressed in a single subinstruction.

FIG. 5C depicts a subinstruction storage for instructions such as the muladd instruction. Resource size and speed constraints are imposed on instruction storage so that the number of bits in a subinstruction are limited. The four register specifiers for the subinstruction use nearly the entire capacity of the subinstruction storage. For example, a register file segment that includes 128 bits has registers that are uniquely addressed using seven address bits. Addressing of four registers consumes 7*4=28 bits. For a subinstruction size constrained to 32 bits, only four bits remain for specifying an operation code or other operational information for controlling execution.

The illustrative VLIW processor partitions the register file into local and global registers to conserve address bits in a very long instruction word to reduce the size of the register file and accelerate access time.

Figure 6:
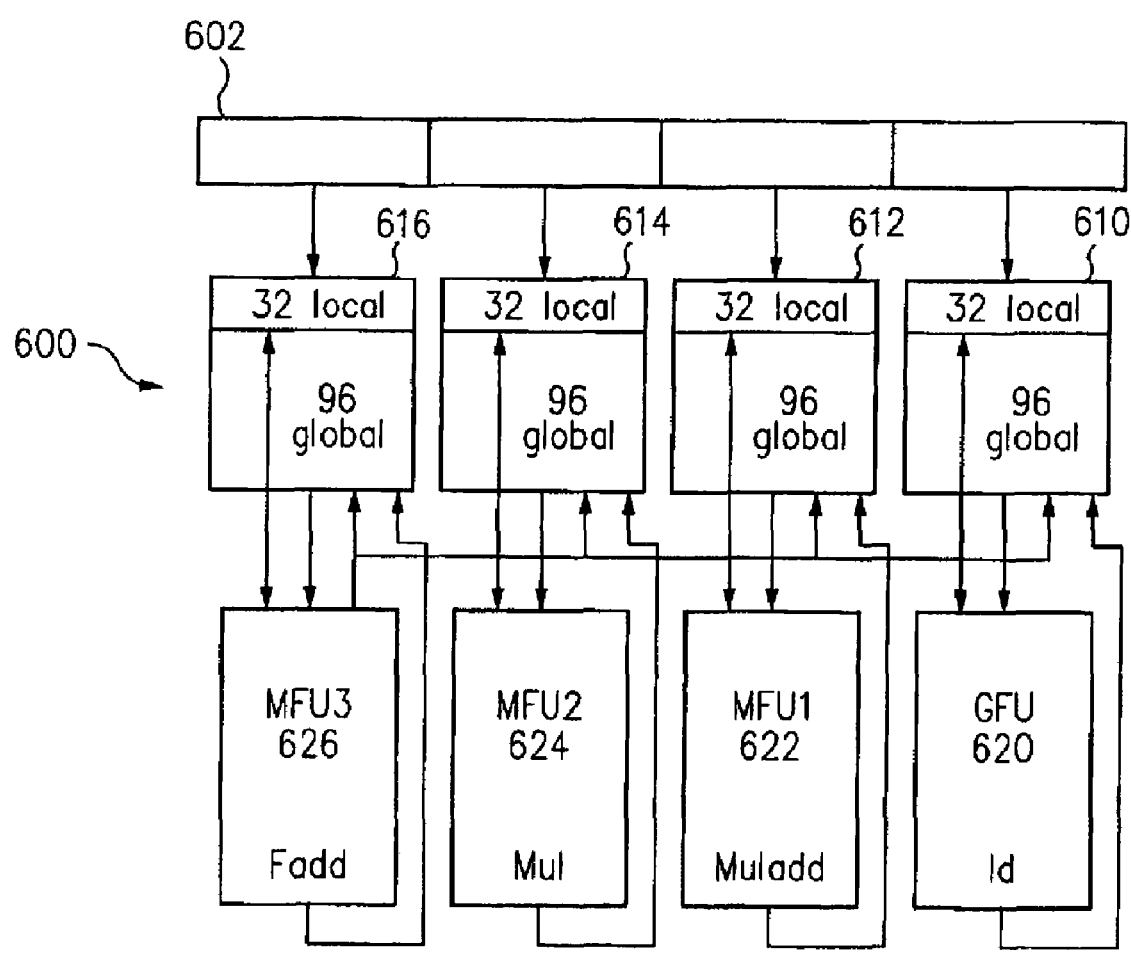
FIG. 6 is a schematic block diagram showing a register file for a VLIW processor that includes global and local register partitioning.

Referring to FIG. 6, a schematic block diagram shows a register file 600 for a VLIW processor 100 that includes global and local register partitioning. The Very Long Instruction Word (VLIW) processor has a plurality of functional units including three media functional units 622, 624, and 626, and a general functional unit 620. The processor 100 also includes a multi-ported register file 600 that is divided into a plurality of separate register file segments 610, 612, 614, and 616, each of the register file segments being associated to one of the plurality of functional units and to a decoder block of decoder 602. The register file segments 610, 612, 614, and 616 are partitioned into local registers and global registers. The global registers are read and written by all functional units 620, 622, 624, and 626. The local registers are read and written only by a functional unit associated with a particular register file segment. The local registers and global registers are addressed using register addresses in an address space that is separately defined for a register file segment/functional unit pair including register file segment 610/general functional unit 620, register file segment 612/media functional unit 622, register file segment 614/media functional unit 624, and register file segment 616/media functional unit 626.

The global registers are addressed within a selected global register range using the same register addresses for the plurality of register file segment/functional unit pairs, for example, global registers 0-95. The local registers in a register file segment are addressed using register addresses in a local register range outside the global register range, for example addresses 96-127, that are assigned within a single register file segment/functional unit pair. Register addresses 96-127 applied to the register file segments in the local register range are the same for the plurality of register file segment/functional unit pairs and address registers locally within a register file segment/functional unit pair. The register specifiers of the local registers, as defined external to processor, do not overlap but instead have distinct and different specifiers.

For example, in one embodiment, external to the processor 100, the 96 global registers are addressed using address specifiers 0-95 in all of the four register file segments.

Local registers 96-127 in the register file segment 610, local registers 128-159 in register file segment 612, local registers 160-191 in register file segment 614, and local registers 192-223 in register file segment 616 are all addressed using register addresses 96-127. In this example, the total number of distinct and independent registers is 96+(4*32)=224. The 224 registers are addressed using 7 bits that define an address space from 0-127, rather than the 8 bits that are otherwise required to access 224 registers.

Global and local register partitioning advantageously leverages the information content of register specifier bits in an instruction word by inherently communicating information by position dependence within a VLIW instruction group. The positioning of a register specifier in the instruction word thus communicates addressing information. The additional information allows a compiler or programmer to specify more registers in fewer bits than have been specified conventionally.

One address bit is thus saved for each of the four subinstruction positions, a savings of four bits per subinstruction and a savings of 16 bits per VLIW instruction. The reduction in address bits is highly advantageous in a VLIW processor that includes powerful functional units that execute a large plurality of instructions, each of which is to be encoded in the VLIW instruction word.

In general embodiments, the register file 600 includes N physical registers. The N-register register file 600 is duplicated into M register file segments 610, 612, 614, and 616, each having a reduced number of read and/or write ports in comparison to a nonduplicated register file, but each having the same number of physical registers. The register file segments are partitioned into $N_G$ global and $N_L$ local register files where $N_G$ plus $N_L$ is equal to N. The register file operates equivalently to having $N_G+(M*N_L)$ total registers available for the M functional units. The number of address bits for addressing the $N_G+(M*N_L)$ total registers remains equal to the number of bits B that are used to address $N=2^B$ registers. The local registers for each of the M register file segments are addressed using the same B-bit values.

In some embodiments, partitioning of the register file 600 is programmable so that the number $N_G$ of global registers and number $N_L$ of local registers is selectable and variable. For example, a register file including four register file segments each having 128 registers may be programmably configured as a flat register file with 128 global registers and 0 local registers with the 128 registers addressed using seven address bits. Alternatively, the four register file segments may be programmably configured, for example, to include 64 global registers and 64 local registers so that the total number of registers is 64+(4*64)=320 registers that are again addressed using 7 bits rather than the 9 bits that would otherwise be required to address 320 registers.

Figure 7:
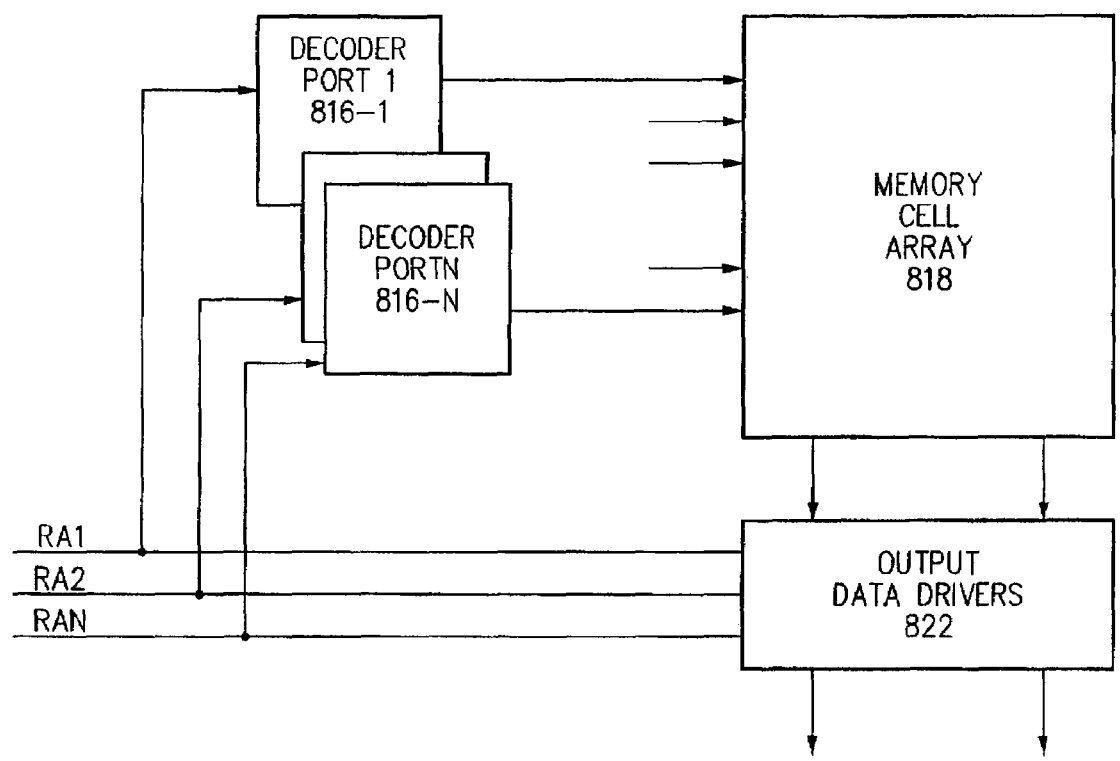
FIG. 7 illustrates a schematic block diagram of an SRAM array used for the multi-port split register file.

Referring to FIG. 7, a schematic block diagram depicts an embodiment of the multiport register file 216. A plurality of read address buses RA1 through RAN carry read addresses that are applied to decoder ports 816-1 through 816-N, respectively. Decoder circuits are well known to those of ordinary skill in the art, and any of several implementations could be used as the decoder ports 816-1 through 816-N. When an address is presented to any of decoder ports 816-1 through 816-N, the address is decoded and a read address signal is transmitted by a decoder port 816 to a register in a memory cell array 818. Data from the memory cell array 818 is output using output data drivers 822. Data is transferred to and from the memory cell array 818 under control of control signals carried on some of the lines of the buses of the plurality of read address buses RA1 through RAN.

Figure 8A:
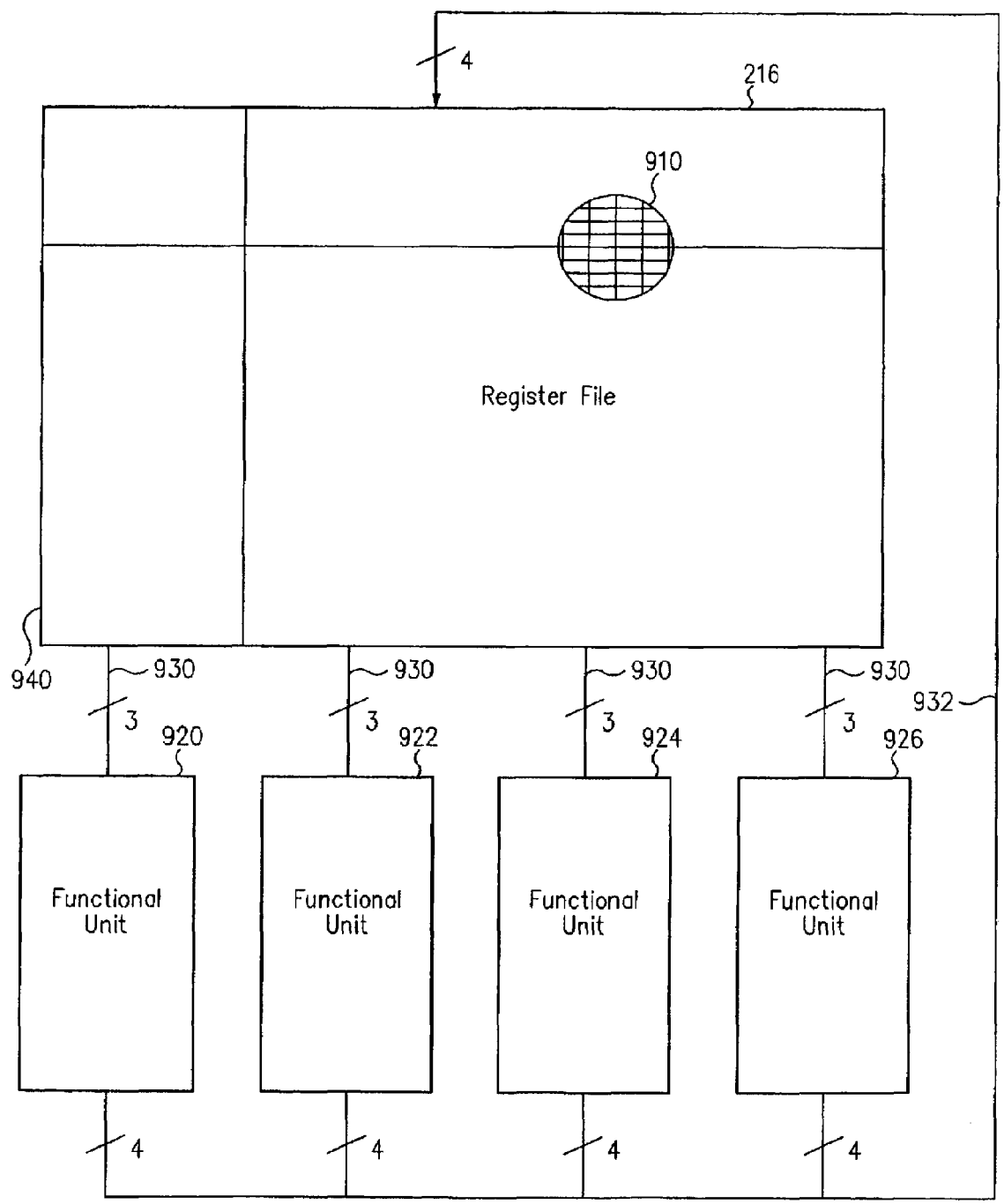
FIGS. 8A and 8B are, respectively, a schematic block diagram and a pictorial diagram that illustrate the register file and a memory array insert of the register file.
Figure 8B:
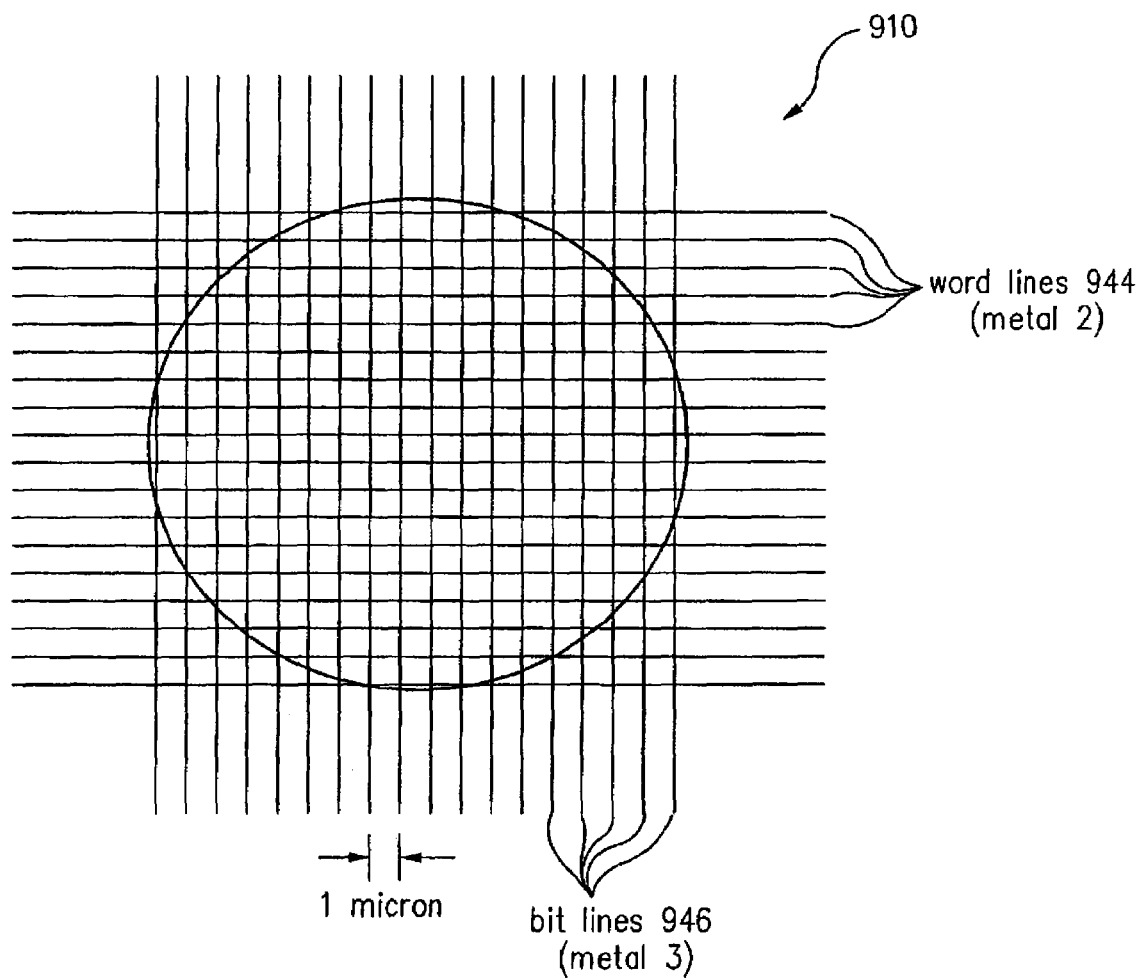

Referring to FIGS. 8A and 8B, a schematic block diagram and a pictorial diagram, respectively, illustrate the register file 216 and a memory array insert 910. The register file 216 is connected to a four functional units 920, 922, 924, and 926 that supply information for performing operations such as arithmetic, logical, graphics, data handling operations and the like. The illustrative register file 216 has twelve read ports 930 and four write ports 932. The twelve read ports 930 are illustratively allocated with three ports connected to each of the four functional units. The four write ports 932 are connected to receive data from all of the four functional units.

The register file 216 includes a decoder, as is shown in FIG. 6, for each of the sixteen read and write ports. The register file 216 includes a memory array 940 that is partially shown in the insert 910 illustrated in FIG. 8B and includes a plurality of word lines 944 and bit lines 946. The word lines 944 and bit lines 946 are simply a set of wires that connect transistors (not shown) within the memory array 940. The word lines 944 select registers so that a particular word line selects a register of the register file 216. The bit lines 946 are a second set of wires that connect the transistors in memory array 940. Typically, the word lines 944 and bit lines 946 are laid out at right angles. In the illustrative embodiment, the word lines 944 and the bit lines 946 are constructed of metal laid out in different planes such as a metal 2 layer for the word lines 944 and a metal 3 layer for the bit lines 946. In other embodiments, bit lines and word lines may be constructed of other materials, such as polysilicon, or can reside at different levels than are described in the illustrative embodiment, that are known in the art of semiconductor manufacture. In the illustrative example, the word lines 944 are separated by a distance of about 1 µm and the bit lines 946 are separated by approximately 1 µm. Other circuit dimensions may be constructed for various processes. The illustrative example shows one bit line per port, other embodiments may use multiple bit lines per port.

When a particular functional unit reads a particular register in the register file 216, the functional unit sends an address signal via the read ports 930 that activates the appropriate word lines to access the register. In a register file having a conventional structure and twelve read ports, each cell, each storing a single bit of information, is connected to twelve word lines to select an address and twelve bit lines to carry data read from the address.

The four write ports 932 address registers in the register file using four word lines 944 and four bit lines 946 connected to each cell. The four word lines 944 address a cell and the four bit lines 946 carry data to the cell.

Thus, if the illustrative register file 216 were laid out in a conventional manner with twelve read ports 930 and four write ports 932 for a total of sixteen ports and the ports were 1 µm apart, one memory cell would have an integrated circuit area of 256 µm² (16×16). The area is proportional to the square of the number of ports.

The register file 216 is alternatively implemented to perform single-ended reads and/or single-ended writes utilizing a single bit line per port per cell, or implemented to perform differential reads and/or differential writes using two bit lines per port per cell.

Figure 9:
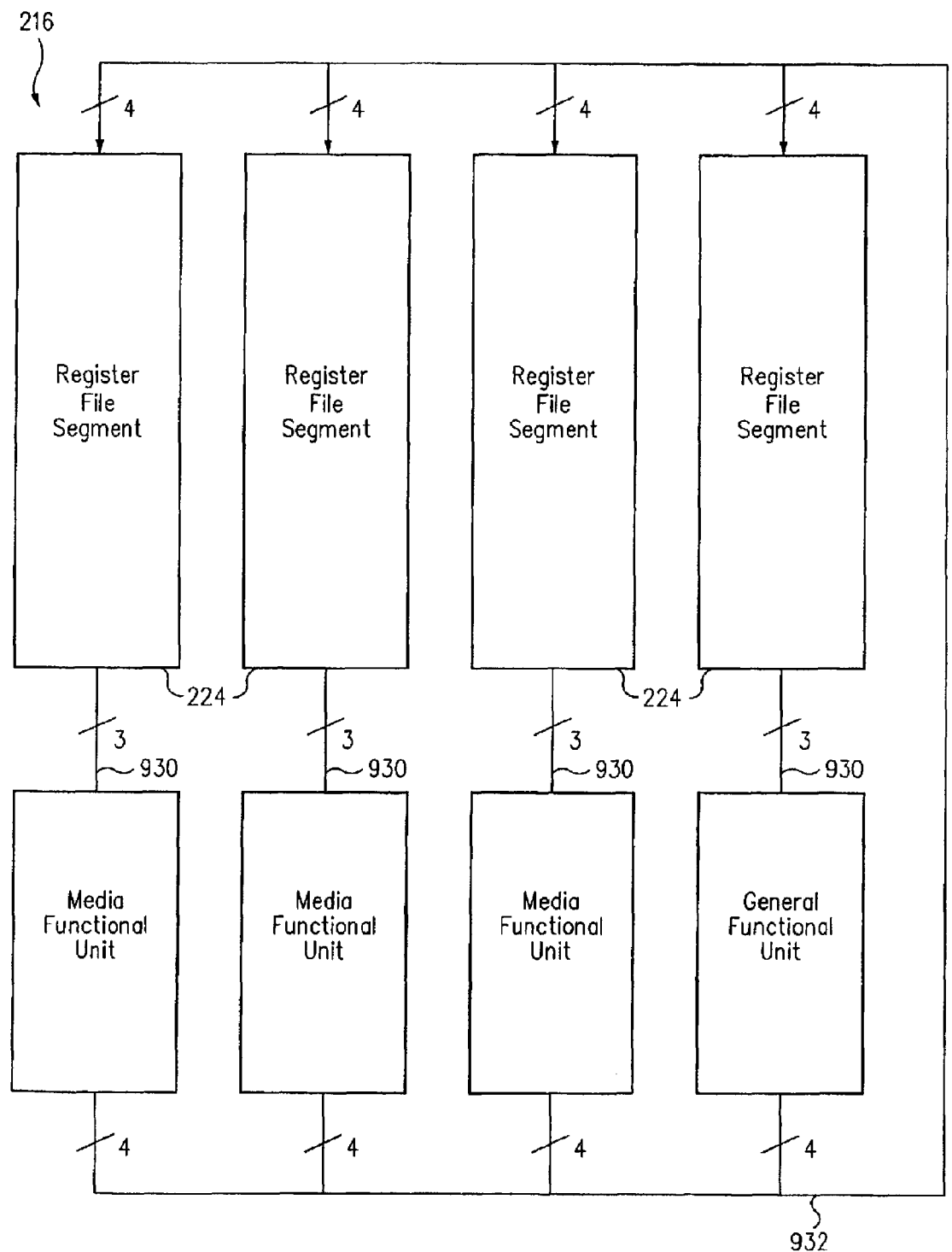
FIG. 9 is a schematic block diagram showing an arrangement of the register file into the four register file segments.

However, in this embodiment the register file 216 is not laid out in the conventional manner and instead is split into a plurality of separate and individual register file segments 224. Referring to FIG. 9, a schematic block diagram shows an arrangement of the register file 216 into the four register file segments 224. The register file 216 remains operational as a single logical register file in the sense that the four of the register file segments 224 contain the same number of registers and the same register values as a conventional register file of the same capacity that is not split. The separated register file segments 224 differ from a register file that is not split through elimination of lines that would otherwise connect ports to the memory cells. Accordingly, each register file segment 224 has connections to only three of the twelve read ports 930, lines connecting a register file segment to the other nine read ports are eliminated. All writes are broadcast so that each of the four register file segments 224 has connections to all four write ports 932. Thus each of the four register file segments 224 has three read ports and four write ports for a total of seven ports. The individual cells are connected to seven word lines and seven bit lines so that a memory array with a spacing of 1 µm between lines has an area of approximately 49 µm². In the illustrative embodiment, the four register file segments 224 have an area proportional to seven squared. The total area of the four register file segments 224 is therefore proportional to 49 times 4, a total of 196.

The split register file thus advantageously reduces the area of the memory array by a ratio of approximately 256/196 (1.3× or 30%). The reduction in area further advantageously corresponds to an improvement in speed performance due to a reduction in the length of the word lines 944 and the bit lines 946 connecting the array cells that reduces the time for a signal to pass on the lines. The improvement in speed performance is highly advantageous due to strict time budgets that are imposed by the specification of high-performance processors and also to attain a large capacity register file that is operational at high speed. For example, the operation of reading the register file 216 typically takes place in a single clock cycle. For a processor that executes at 500 MHz, a cycle time of two nanoseconds is imposed for accessing the register file 216. Conventional register files typically only have up to about 32 registers in comparison to the 128 registers in the illustrative register file 216 of the processor 100. A register file 216 that is substantially larger than the register file in conventional processors is highly advantageous in high-performance operations such as video and graphic processing. The reduced size of the register file 216 is highly useful for complying with time budgets in a large capacity register file.

In some embodiments, the area of a register file is further reduced by using a special memory cell for the local registers that have write port connections to the functional unit that is locally associated with the register file segment. Thus the local registers are only written by the local functional unit. In the illustrative register file 216, the special cell for local registers has only a single write port, reducing the number of word lines to four. The number of bit lines connected to the local registers is also reduced to four, allowing further compactness to the cell.

Figure 10:
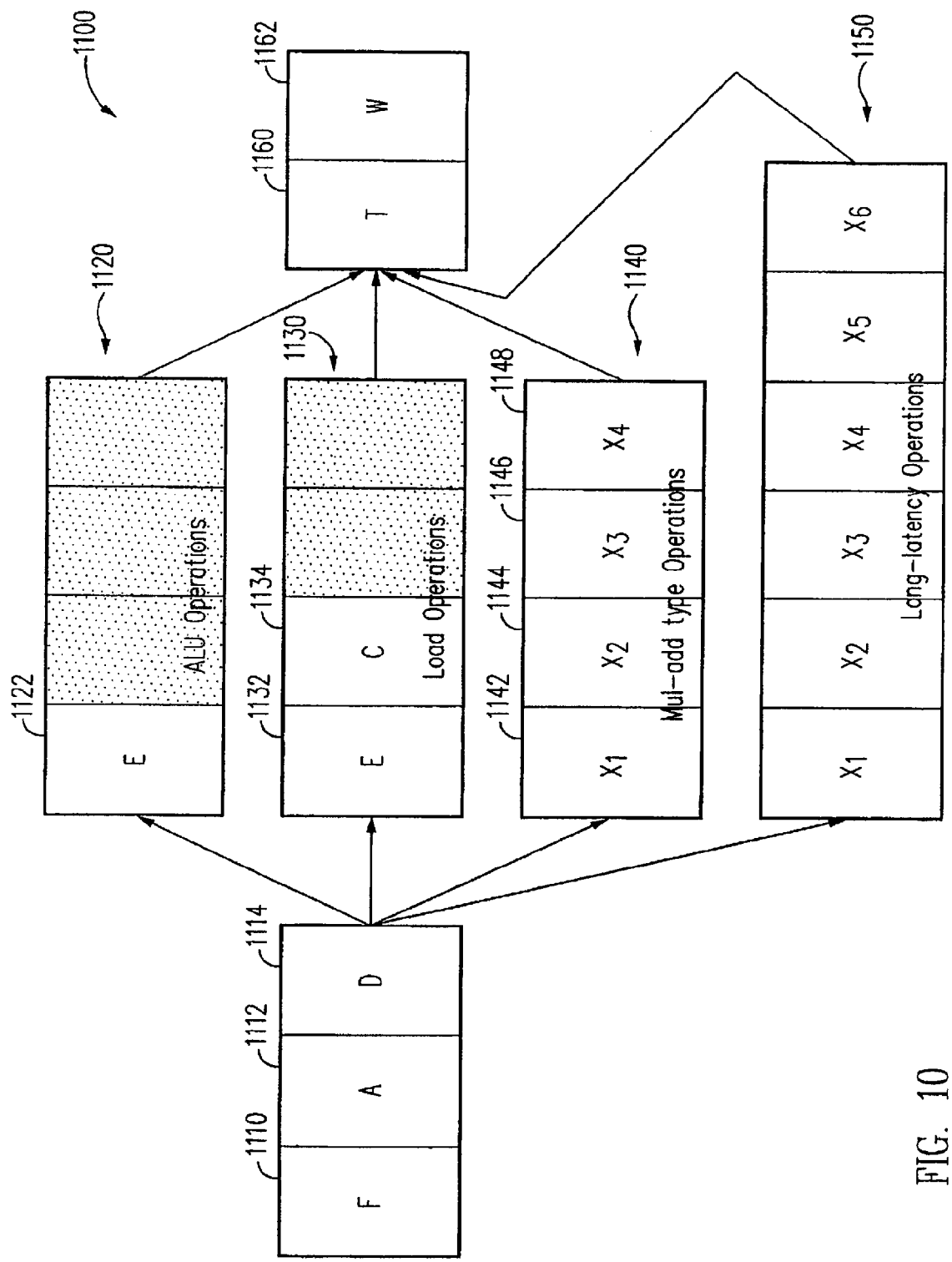
FIG. 10 is a schematic timing diagram that illustrates timing of the processor pipeline. The use of the same reference symbols in different drawings indicates similar or identical items.

Referring to FIG. 10, a simplified schematic timing diagram illustrates timing of the processor pipeline 1100. The pipeline 1100 includes nine stages including three initiating stages, a plurality of execution phases, and two terminating stages. The three initiating stages are optimized to include only those operations necessary for decoding instructions so that jump and call instructions, which are pervasive in the Java™ language, execute quickly. Optimization of the initiating stages advantageously facilitates branch prediction since branches, jumps, and calls execute quickly and do not introduce many bubbles.

The first of the initiating stages is a fetch stage 1110 during which the processor 100 fetches instructions from the 16 Kbyte two-way set-associative instruction cache 210. The fetched instructions are aligned in the instruction aligner 212 and forwarded to the instruction buffer 214 in an align stage 1112, a second stage of the initiating stages. The aligning operation properly positions the instructions for storage in a particular segment of the four register file segments 310, 312, 314, and 316 and for execution in an associated functional unit of the three media functional units 220 and one general functional unit 222. In a third stage, a decoding stage 1114 of the initiating stages, the fetched and aligned VLIW instruction packet is decoded and the scoreboard (not shown) is read and updated in parallel. The four register file segments 310, 312, 314, and 316 each holds either floating-point data or integer data. The register files are read in the decoding (D) stage.

Following the decoding stage 1114, the execution stages are performed. The two terminating stages include a trap-handling stage 1160 and a write-back stage 1162 during which result data is written-back to the split register file 216.

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims. For example, the described structure and operating method may be applied to a register file and processor of any suitable size. The register file may be much larger or much smaller than the described 128 registers. The very long instruction word may include any suitable number of subinstructions.

Similarly, although the illustrative register file has one bit line per port, in other embodiments more bit lines may be allocated for a port. The described word lines and bit lines are formed of a metal. In other examples, other conductive materials such as doped polysilicon may be employed for interconnects. The described register file uses single-ended reads and writes so that a single bit line is employed per bit and per port. In other processors, differential reads and writes with dual-ended sense amplifiers may be used so that two bit lines are allocated per bit and per port, resulting in a bigger pitch. Dual-ended sense amplifiers improve memory fidelity but greatly increase the size of a memory array, imposing a heavy burden on speed performance. Thus the advantages attained by the described register file structure are magnified for a memory using differential reads and writes. The spacing between bit lines and word lines is described to be approximately 1 μm. In some processors, the spacing may be greater than 1 μm. In other processors the spacing between lines is less than 1 μm.

What is claimed is:

1. A processor comprising:
a plurality of functional units; and
a register file that is divided into a plurality of register file segments, each coupled to, and associated with, a respective one of the functional units, wherein read ports of each register file segment are coupled only to the associated functional unit and not to any of the other functional units, wherein write operations of any functional unit are broadcast to all of the register file segments, and wherein each of the register file segments is partitioned into a local portion addressable only by the associated functional unit and a global portion.

2. The processor of claim 1,
wherein the partition of register file segments into local and global portions is configurable.

3. The processor of claim 1,
wherein the segmented register file is implemented as a addressable storage array having R read ports and W write ports, wherein respective subsets, less than all, of the R read ports are coupled to each functional unit.

4. The processor of claim 1,
wherein a total number of read ports, including those coupled to each functional unit, substantially exceeds a number of write ports of the register file.

5. The processor of claim 1,
wherein the processor is a Very Long Instruction Word (VLIW) processor and each of the functional units corresponds to a subinstruction position of an instruction word; and
wherein the segmented register file with local and global portions facilitates a compact coding of register addresses in the instruction word.

6. The processor of claim 1, further comprising:
a decoder for decoding the instruction word including a plurality of subinstructions, the subinstructions being allocated into positions of the instruction word that correspond to respective ones of the functional units, wherein at least some of the subinstructions include register addresses usable to address a particular local register of the associated register segment.

7. A method of operating a processor, the method comprising:
executing instructions using a plurality of functional units;
in connection with the instruction executions, addressing storage in a register file that is divided into a plurality of register file segments, each coupled to, and associated with, a respective one of the functional units, wherein read ports of each register file segment are coupled only to the associated functional unit and not to any of the other functional units, and wherein each of the register file segments is partitioned into a local portion addressable only by the associated functional unit and a global portion; and
in connection with write operations of the instruction executions, broadcasting results of the write operations to all of the register file segments.

8. The method of claim 7, further comprising:
replicating global register data in respective registers of the global portion of each of the register file segments; and
for each functional unit, accessing local register data only in registers of the local portion of the associated register file segment.

9. The method of claim 7, further comprising:
performing the partitioning of the register file segments into global and local register portions.

10. The method of claim 7, further comprising:
addressing registers of the local and global portions of an associated register file segment using register addresses in an address space that is defined for a register file segment/functional unit pair.

11. The method of claim 7,
wherein the partition of register file segments is into $N_G$ global registers and $N_L$ local register where $N=N_G+N_L$ and wherein the functional units number M; and
further comprising operating the register file as having $N_G+(M*N_L)$ addressable registers available for the M functional units and employing no more than $\log_2 N$ address bits for addressing of individual ones of the $N_G+(M*N_L)$ registers in the register file.

* * * * *